United States Patent

[11] 3,585,789

| [72] | Inventors | Allison W. Blanshine<br>Lititz;<br>Edward C. Procter, New Holland, both of, Pa. |
|---|---|---|
| [21] | Appl. No. | 810,712 |
| [22] | Filed | Mar. 26, 1969 |
| [45] | Patented | June 22, 1971 |
| [73] | Assignee | Sperry Rand Corporation<br>New Holland, Pa. |

[54] THREE ROW ROW CROP ATTACHMENT
13 Claims, 12 Drawing Figs.

[52] U.S. Cl. ..................................................... 56/98, 56/106
[51] Int. Cl. ....................................................... A01d 45/02
[50] Field of Search .......................................... 56/98, 106, 105, 59, 66, 69, 75, 78, 82, 88, 93, 108, 111, 15—18

[56] References Cited
UNITED STATES PATENTS
| 1,663,843 | 3/1928 | Imig | 56/106 |
| 2,279,183 | 4/1942 | Stimatze | 56/98 |
| 2,737,770 | 3/1956 | Wigham | 56/98 |
| 3,352,093 | 11/1967 | Procter | 56/98 |

*Primary Examiner*—Louis G. Mancene
*Assistant Examiner*—J. A. Oliff
*Attorneys*—Joseph A. Brown, John C. Thompson, James J. Kennedy and George C. Bower

ABSTRACT: A three row row crop attachment has a frame and crop guides forming three passages. Twelve upper and lower crop gathering chains pull stalklike crops through the passages against a cutting sickle and deliver the crops through narrow troughs of the passages to the feed rolls of a supporting forage harvester. The upper and lower crop gathering chains are in six sets. The crop gathering chains of each set are on opposite sides of a passage with the lower chains in each of the troughs extending to the feed rolls. The lower crop gathering chains are on three levels and the upper crop gathering chains are on two levels. The frame and the crop guides are interiorly open for clearing debris. The wobble gear drive is recessed clear of the various drives and the power takeoff.

THREE ROW ROW CROP ATTACHMENT

BACKGROUND OF THE INVENTION

The invention relates to row crop attachments for harvesting stalk type crops such as corn and sorghum and the feeding of the cut crops to a forage harvester.

In the preparation of forage from stalklike crops such as corn and sorghum the entire stalk including the corn and grain is cut and fed to a forage harvester for chopping it into small feed pieces. Harvesting attachments have been developed to cut one row, two rows or three rows at one time. These attachments have crop gathering chains for pulling the stalk against the cutting sickle and feeding the stalk to the feed rolls of the forage harvester at the rear center of the attachment. The lower crop gathering chains should extend to the feed rolls. However, in previous three row row crop attachments difficulties are encountered in providing a pair of lower crop gathering chains for each trough and extending the chains to the feed rolls. Also, due to the closeness of the chains the crop engaging lugs are shortened and opposing chains are omitted. At the feed roll end, space is restricted and the crop guiding troughs converge. The lower chains are, therefore, omitted or terminate short of the feed rolls.

The attachments have been usually mounted on a self-propelled tractor. However, the drawing of a forage harvester by a tractor is often desirable and the attachment drives should not interfere with the power takeoff to the forage harvester. On the attachment the wobble sickle drive should be more compact and clear of the power takeoff.

It is the purpose of this invention to increase the number of gathering chains and to position the ends of some of the lower chains closer to the rear opening or feed rolls. A further purpose is to provide a sickle wobble drive clear of the power takeoff of a drawing tractor and the drives for the crop gathering chains.

OBJECTS AND SUMMARY OF THE INVENTION

An object of this invention is provide a three row row crop attachment that has crop gathering chain means in each trough which carry stalks up to the feed rolls.

Another object of this invention is to provide a three row row crop attachment that has 12 crop gathering chains.

Another object of this invention is to provide a three row row crop attachment with 12 crop gathering chains in which adjacent or opposing crop gathering chains do not interfere.

Another object of this invention is to provide a three row row attachment that has the interior open to pass stalk debris.

Another object of this invention is to provide a frame and housing means that prevents the accumulation of debris within the frame and crop guiding means.

Another object of this invention is to provide a three row row attachment with a wobble drive that is clear of a power take off drive and the crop gathering chain drives.

In summary the three row row crop attachment comprises frame and crop guiding means with center and converging outer passages with upper and lower crop gathering means for pulling stalklike crops through the passages against a sickle and through converging troughs of the passages to forage harvester feed rolls with the lower crop gathering means being on each side of the troughs and extending to the feed rolls in three levels.

Other and further objects and advantages of this invention will be apparent from the following specification and appended claims taken in connection with the drawings which are substantially proportionate to the actual three row row crop attachment.

DETAILED DESCRIPTION OF THE PREFERRED EMBODIMENT

Introduction

Figure 1:
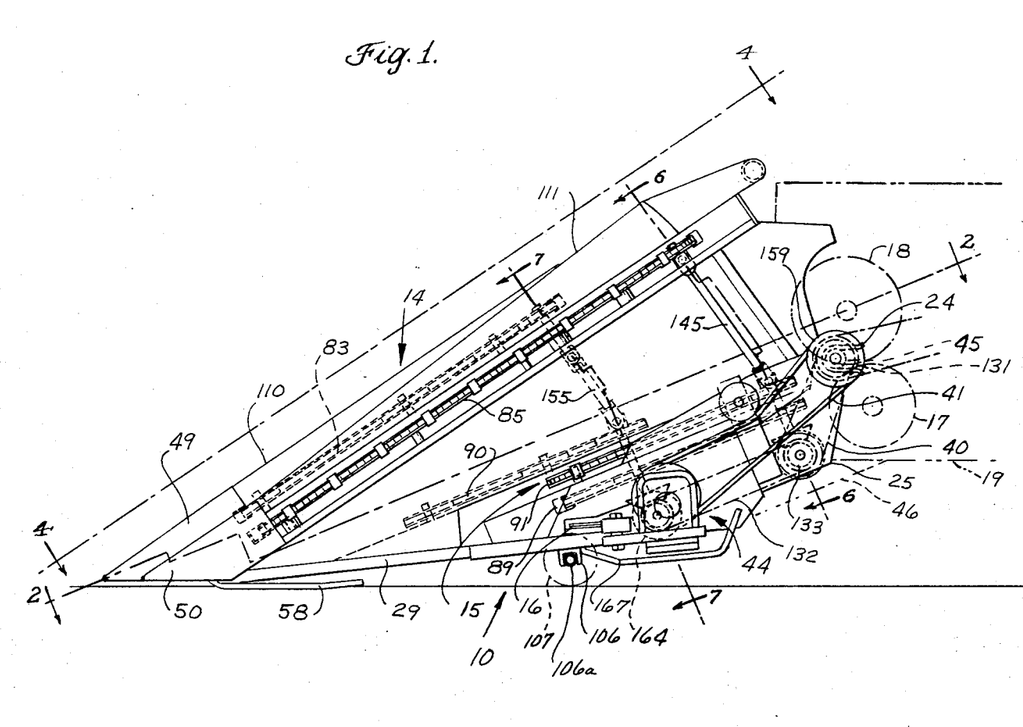
FIG. 1 is a left side view of the attachment.
Figure 2:
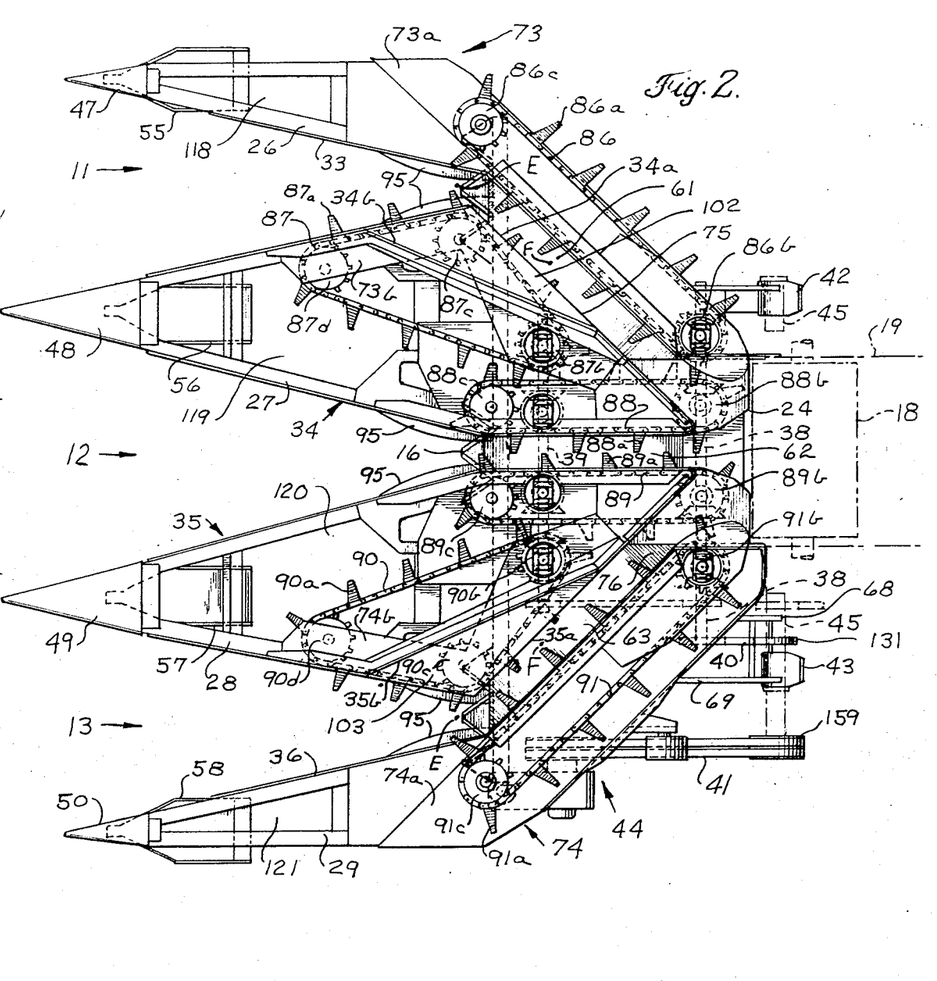
FIG. 2 is a sectional view of the attachment taken along lines 2-2 of FIG. 1 illustrating lower crop gathering means and the supporting frame and crop guiding means.
Figure 3:
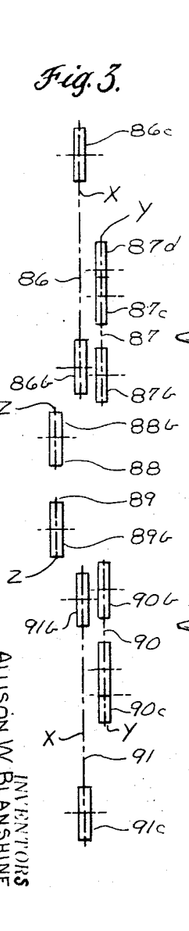
FIG. 3 is a diagrammatic view illustrating the different levels of the lower crop gathering means.
Figure 4:
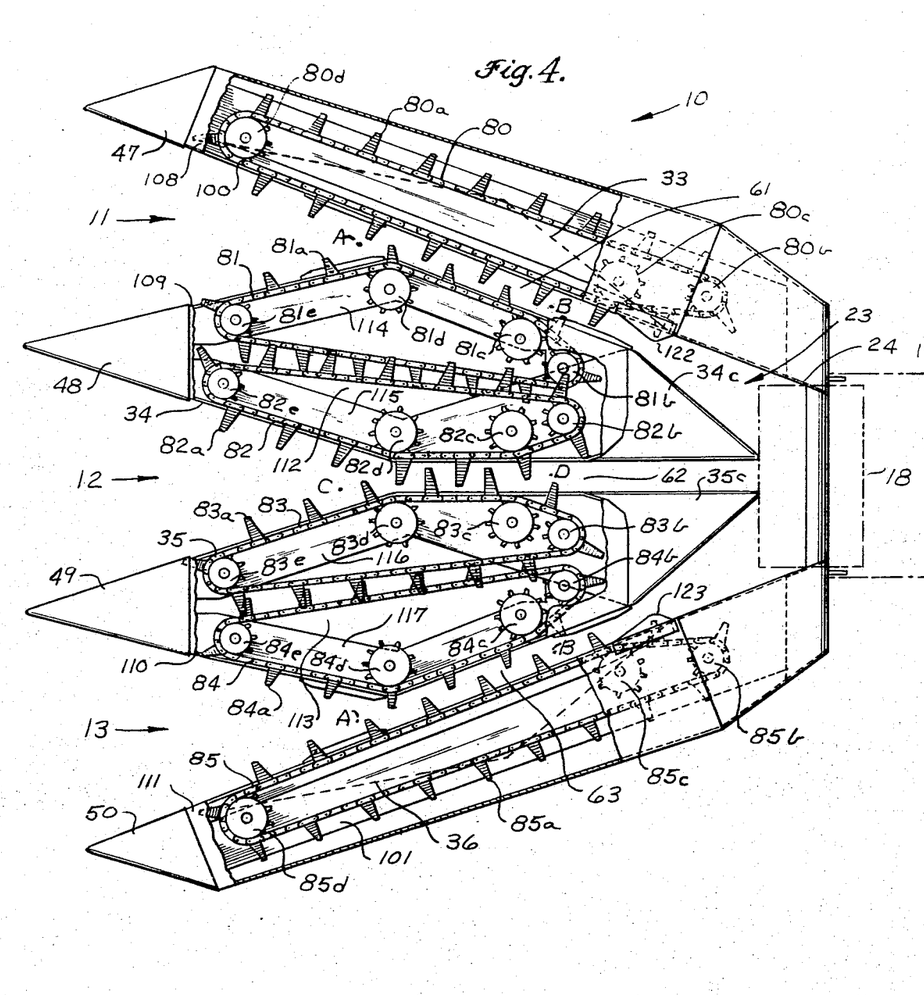
FIG. 4 is a top view of the attachment taken in direction indicated by arrows 4-4 of FIG. 2 to illustrate the upper crop gathering chains and the supporting frame and housing means.

The three row row crop attachment has frame means 10 with three crop passages or stalkways 11, 12, 13 (FIGS. 2 & 4) and upper and lower crop gathering chain means 14,15 (FIG. 1) for pulling stalks through the passages against a lateral sickle 16 for delivery of the cut stalks to the feed rolls 17,18 of a supporting forage harvester 19 (dot-dot-dash lines) through a center rear discharge space 23 (FIG. 4) and opening 24. The frame means 10 has a base frame 25 (FIGS. 1, 8 and 9) and four lower frame members 26, 27, 28, 29 (FIG. 2) extending longitudinally forwardly from the base frame 25. Crop guiding means are mounted on the frame means 10 and comprise two inner housing members 34,35 and two side support members 33,36. (FIGS. 2 and 4).

The crop gathering chains and the wobble drive 44 (FIGS. 1, 2, 10—12) are driven from the forage harvester by chain means 40 and belt means 41, respectively. The forage harvester 19 may be driven by a power takeoff (not shown) from a pulling tractor or from the engine (not shown) on a self-propelled forage harvester. The upper and lower crop gathering chain means 14, 15 are operated by drive means 37 (FIGS. 6 and 7) from two main drive shafts 38, 39 rotatably mounted in the base frame 25. The sickle wobble drive 44 (FIGS. 1, 10, 11 & 12) is on the left side of base frame.

The base frame 25 has brackets 42,43 on opposite sides of the rear discharge opening 24 for fastening the attachment to supports 45 (FIG. 2) on the forage harvester and rests on arms 46 (FIG. 1) projecting forwardly from the forage harvester. On the front of the lower frame member are divider points 47, 48, 49, 50 for engaging stalks and shoes 55, 56, 57, 58 (FIG. 2) for guiding and lifting the attachment on engaging the ground. The upper crop gathering chain means 14 extends forwardly and downwardly to the crop divider points mounted on the front of the lower frame members and the crop guiding means to pickup bent or tilted stalks and draw them into the crop receiving passages along with the standing stalks. The upper and lower crop gathering means, 14,15 carry the stalks against the sickle and pull the cut stalks up the trough 61, 62, 63 of the passages for a stalkway discharge into the feed rolls.

FRAME MEANS

Figures 6, 7:
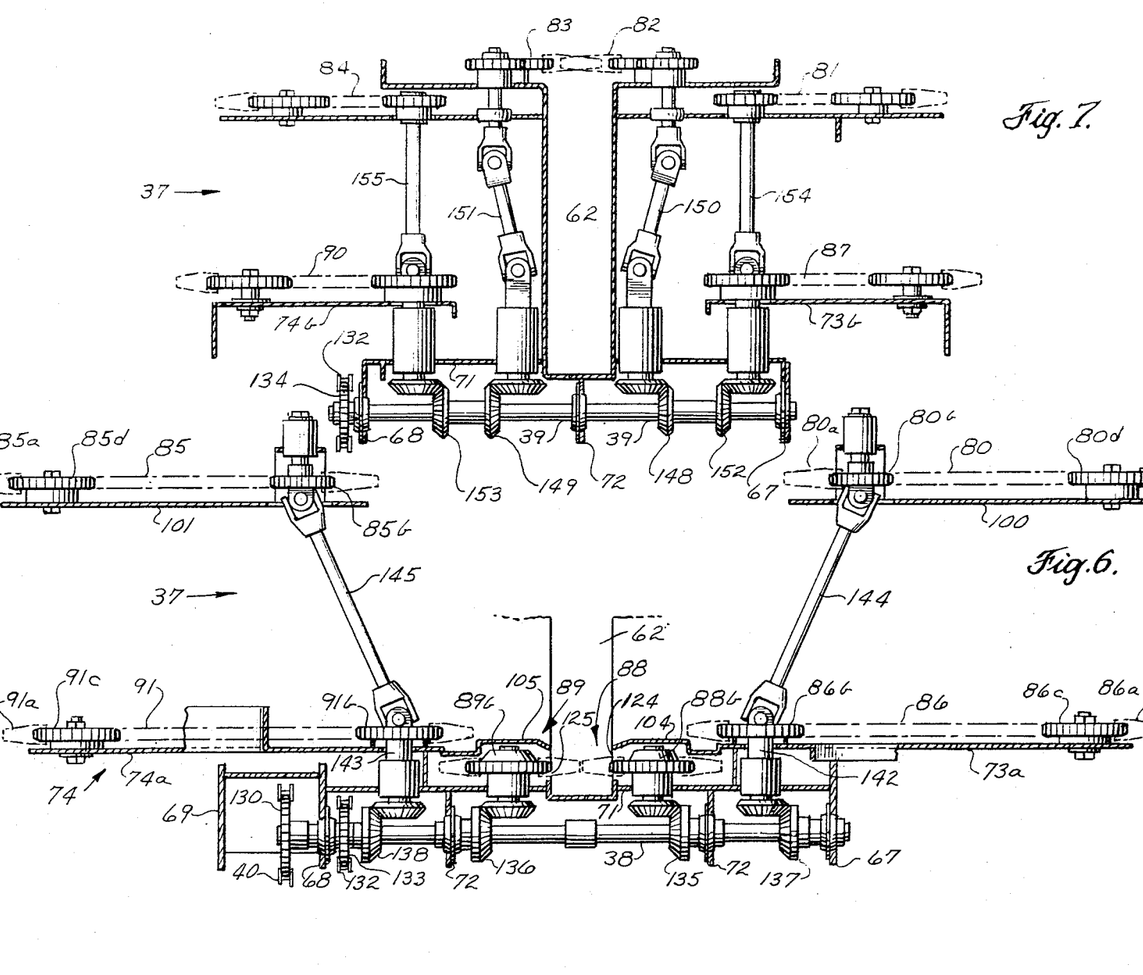
FIG. 6 is a sectional forward view taken along lines 6-6 of FIG. 1 of the drive means for the crop gathering chains at the lower center trough and the upper and lower crop gathering chains on the outer right and left sides.
FIG. 7 is a sectional forward view taken along lines 7-7 of FIG. 1 of the drive means for the upper center trough crop gathering chains and the upper and lower inner crop gathering chains on the inner right and left sides.
Figures 8, 9:
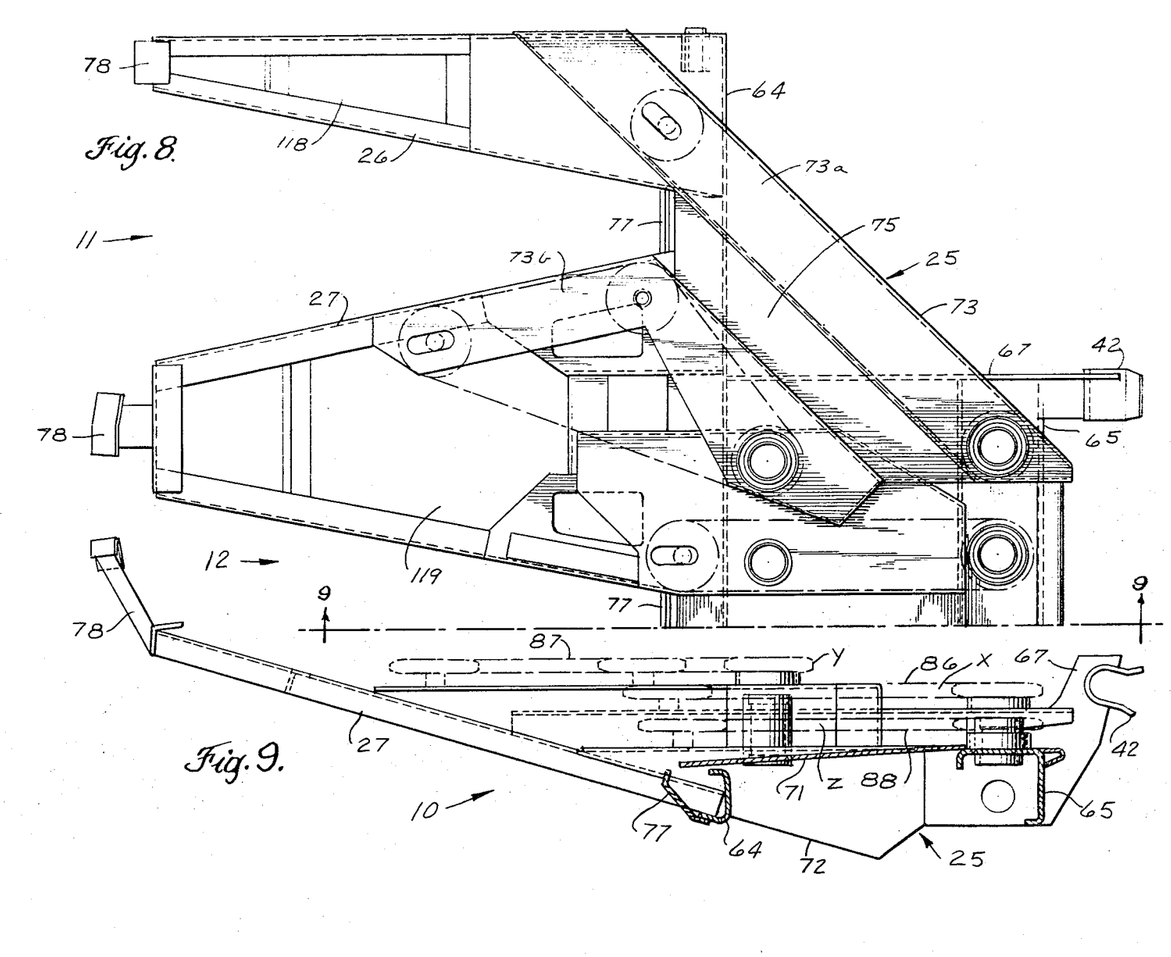
FIG. 8 is a fragmentary top view of the right side of the frame means taken along lines 9-9 of FIG. 8 illustrating the trilevel lower crop gathering chain means.
FIG. 9 is a sectional side view of the right side of the frame means taken along lines 9-9 of FIG. 8 illustrating the trilevel lower crop gathering chain means.

The forage harvester supports the base frame 25 at a longitudinal angle to the horizontal and the four lower frame members 26, 27, 28, 29 extending longitudinally forward from the base frame at a lesser longitudinal angle. A lateral beam 64 (FIGS. 8 & 9) extends across the attachment at the juncture of the lower frame members and the base frame. The lower frame members are secured thereto. At the center of the rear of the base frame is a short rear cross beam 65 with longitudinally extending vertical flangelike supports 67,68 (FIGS. 6, 7 & 8). Center platelike means 71 extends between the lateral beam 64 (FIG. 9) and rear beam 65 to form a bottom to the attachment and have supports 72 extending downwardly perpendicular thereto for the main drive shafts 38,39. On each side of the frame means, side channeled platelike means 73,74 (FIGS. 2 and 8) extend at an angle from the center platelike means 71 to the side lower frame members 33,36 and the inner lower frame members 34,35 and have channels 75,76 (FIGS. 2 & 8) forming the converging angulated bottom part of the side troughs 61,63 The side platelike means 73, 74 are at a higher level than the center platelike means. The center and side platelike means are the chainboards for the lower center and lower side crop gathering chains 88, 89, 86, 91, and 87,90. As illustrated in FIGS. 6 and 7 the outer chainboards 73a,74a are lower than the inner chainboards 73b,74b so that the sets of lower crop gathering chains are at different levels as explained later herein.

The sickle 16 extends laterally across the attachment above the lower frame members 26, 27, 28, 29 and in front of the lateral beam 64. Knives 95 extend along the sides of the lower frame members on each side of the passages and in front of the sickle to cooperate with the sickle in severing the stalks. Protectors 77 (FIG. 8) are between the lower members underneath the sickle. The lower frame members are triangular in shape with the base portion attached to the lateral beam and are of an open frame construction with large triangular spaces, 118, 119, 120, 121 (FIG. 2). At the front ground engaging shoes 55—58 are mounted on the bottom and the divider pointers 47—50 extend forwardly from the top of the lower frame members for engaging the crops. Supports 78 are provided on the front ends of the lower frame members for the divider points (FIG. 8).

Figures 10, 11, 12:
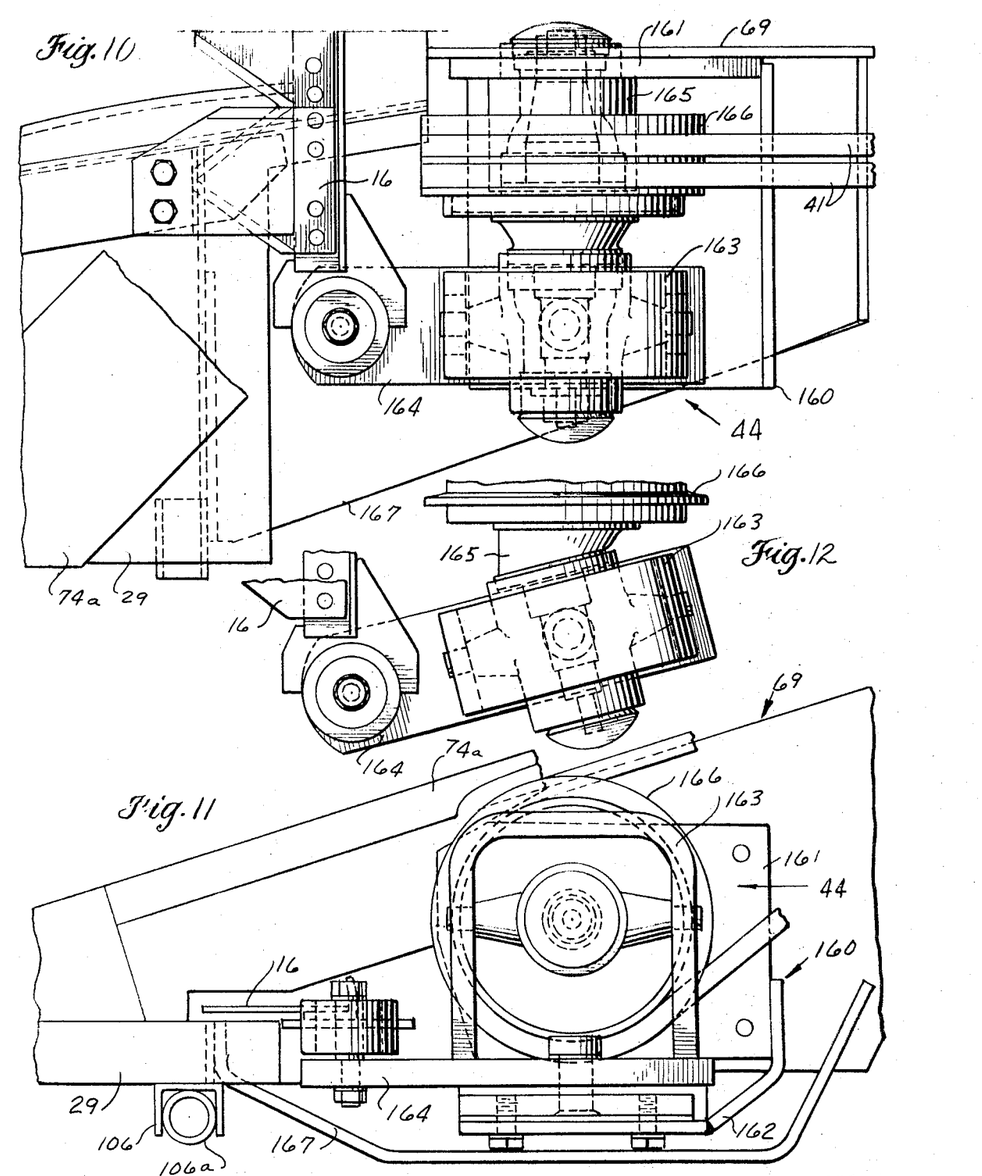
FIG. 10 is a top view of the wobble drive for the sickle.
FIG. 11 is an end view of the wobble drive for the sickle.
FIG. 12 is a fragmentary top view of the wobble drive to illustrate one of the extreme positions of the wobble drive.

The brackets 42, 43 are unsymmetrically positioned at the rear. The right bracket 42 is mounted on the flangelike member 67 and on the left side the bracket 43 is spaced from the end of the rear crossbeam 65 and attached thereto by a supporting frame work 69 (FIGS. 2, 10 & 11). The chain 40 to the crop gathering means is on the inner side and the pulley 159 connected to the wobble sickle drive is on the outer side. The wobble sickle drive is also mounted on the supporting frame work 69.

U-shaped brackets 106 with sockets 106a are provided on the underside of the side lower frame members 26, 29 for the support wheels 107. The wheels are removed when the attachment is mounted on a forage harvester and reinserted in the sockets 106a on removal of the attachment from the forage harvester. The attachment then rests on the wheels 107 and the shoes 55—58.

Stalk Guides and Support for Chain Gathering Means

The crop guiding means has two outer sides 33,36 and two inner housings 34,35 forming the three crop conveying passages or stalkways 11, 12, 13. The crop conveying passages are wide in front and narrow rearwardly to the sickle 16. The passages to the sickle are open at the top and bottom. After the sickle the passages narrow into troughs 61, 62, 63 with bottom channels. The side troughs are at an angle to the longitudinal axis and terminate adjacent the end of the center trough at the discharge opening.

The sides 33,36 are each a single wall bent at an angle to the longitudinal. Chainboards 100,101 (FIGS. 4 & 6) are mounted on top of the respective sides 33,36 for the crop gathering chains 80,85. The walls and chainboards extend from over the base frame to the divider pointers 47, 50.

The inner guide or housing members 34,35 are mounted on the base frame 25 and the two inner lower frame members 27,28, respectively, and have facing walls forming the center passage and trough and walls facing the sides, respectively.

In the right passage, the side 33 is at an angle to the longitudinal to narrow the passage or stalkway towards the sickle. At the sickle the side bends at a greater angle to direct the trough towards the discharge opening. The facing wall on the inner member 34 is reversely angled to the longitudinal to provide a complementary angling. In front of the sickle, the inner wall separates into two portions 34a,34b (FIG. 2). The lower narrower portion 34a extends to the sickle and then bends parallel to the side 33 to merge with the bottom 75 of the trough. The upper and larger portion 34b turns toward the center of the attachment and extends rearwardly parallel to the inner edge of the chainboard 100 and chain 80.

The wall of the inner housing 35 facing the left side 36 is similarly shaped in reverse manner with the lower portion 35a (FIG. 2) extending to the sickle and then angling parallel to the left side. The larger upper portion 35b reverses from the forward portion of the wall and extends parallel to the chainboard 101 and chain 85.

Adjacent the discharge, the inner members have vertically and horizontally taper portions 34c,35c (FIG. 4) merging the three troughs 61, 62, 63 with the discharge space 23. Wear plates 102,103 (FIG. 2) are positioned between the larger and narrower wall portions 34a,34b and 35a,35b, respectively, of the inner members to cover the crop gathering chains 87,90. Similarly the lower center crop gathering chains 88, 89 are also covered at the discharge end by platelike members 104,105 (FIGS. 6 & 7).

At the upper or top edge of the right and left sides are chainboards 100,101 normal to the sides and extending longitudinally down to the divider points. On the inner members the larger portion 34b,35b of the inner wall extends parallel to the chainboards 100,101 respectively. At the lower level the lower side chainboards 73a,74a are at a greater angle to the longitudinal than the upper chainboard 100,101 so that the bottom channels of the troughs are at a greater angle than the top openings. The chainboards 100,101 are straight and extend over the troughs 61 and 63, respectively.

Above the upper crop gathering means are fenders 108, 109, 110, 111 (FIG. 4) to cover the upper chains 80, 81, 82, 83, 84, 85 for protection from injury and entry of cut crops. The inner housings have openings 112, 113 between the top chainboards 114,115 and 116,117 respectively, to permit debris carried in by the chains 81,82 and 83,84 to drop therethrough into the interior spaces between the guide walls and on to the ground through the openings 119,120 in the lower frame members 27,28.

Crop Gathering Chain Means

The six crop gathering chains 80, 81, 82, 83, 84, 85 of the upper crop gathering chain means 14 have crop gathering lugs 80a,81a,a,83a,84a,85a, respectively, which extends into the respective troughs and passages.

Figure 5:
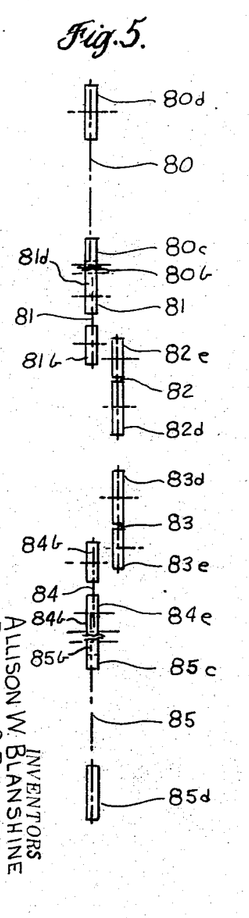
FIG. 5 is a diagrammatic view illustrating the different levels of the upper crop gathering means.

The upper side chains 80,85 are mounted on drive sprockets 80b,85b, adjustable idler sprockets 80c,85c and backing idler sprockets 80d,85d, respectively. The idler sprockets hold the chain in an extended crop gathering position with the lugs extending into the passages and troughs. Edge projections 122,123 are provided on the chainboards 100,101 extending into the troughs 61,63 to strip the stalks from the lugs on turning in under the fenders. On the opposite sides of the passages are chains 81,84 mounted on drive sprockets 81b,84b and idler sprockets 81c, d, e and 84c, d, e to conform the path of projecting lugs 84a,84a to the guide walls. The lugs 80a,85a of the side chains and the lugs 84a,85a of the side facing chains overlap from approximately point A to point B. Point A is in advance of the sickle so that the chains have the stalks firmly gripped on severance. The chains 80, 81, 84, 85 are in the same plane or level as illustrated in FIG. 5.

The two upper center chains 82,83 are in a different plane or level which is above the level of the chains 80, 81, 84, 85. The chains are driven by sprockets 82b,83b and guided by the idler sprockets 82c, d, e and 83c,d,e to conform to the shape of the guide walls. The lugs 82a,83a of the two chains overlap from point C to D with point C being at the sickle 16. With the chains in a different plane or level the lugs of the chains may be of a range of sizes to conform to the best stalk gathering characteristics. The chains 81, 82, 83, 84 terminate well in advance of the feed rolls 17, 18 to provide for the space 24.

The two lower side chains 86,91 two inner lower chains 87,90 opposite to a respective side chain and two center chains 88,89 of the lower crop gathering chain means form three sets of chains in different planes or levels X, Y, Z. The center chains 88,89 are between center platelike means 71 and the cover plates 104,105. The plates 104,105 are on approximately the same level as the bottoms 75,76 of side troughs 61,63. The side through chains 86,91 and 87,90 are on the chainboards 73b,74b and 74a,74b are at a higher level than the chainboards 73a,74a which are on a higher level than the center platelike means 71. The center chains 88,89 are mounted on drive sprockets 88b,89b and idler sprockets 88c,89c with the lugs 88a,89a projecting into the center trough 62 through slots 124,125. The side chains 86,91 are mounted on drive sprockets 86b,91a extending into the troughs adjacent the bottom. The chainboards extend beyond the drive sprockets 86b,91b to strip crop material from the lugs 86a,91a. The inner side facing chains 87,90 are mounted on the drive sprockets 87b,90b and idler sprockets 87c,d, 90c,d. Two idler sprockets are used to conform the chain travel. The lugs 86a,90a of the side chains overlap with the lugs of the inner chains 87a,90a from approximately points E to F with the forward points E at the front of the sickle 16.

The side chains 86,91 and center chains 88,89 terminate at the feed rolls to carry the stalks to the feed rolls. The bottoms of the side troughs are at a higher level than the bottom of the center trough so that the ends of the stalks from the center trough are fed at different levels from the ends of the stalks from the side troughs. Although the three troughs terminate at the discharge opening 24 and space 23 the center trough feeds to the center and the side troughs feed the stalks over the feed from the center trough.

Drive Means for Crop Gathering Chains

Two main drive shafts 38,39 are rotatably mounted on the base frame 25 beneath the center plate 71. The shafts extend laterally with the shaft 39 in front of the rear beam and in back of the lateral beam. The backshaft 38 has an end sprocket 130 connected by chain means 40 to the sprocket 131 on the forage harvester for driving the shaft 38 from the power means on the forage harvester or from a power takeoff. The forward shaft 39 is driven by the chain 132 engaging the sprockets 133,134 on the shafts 38,39, respectively.

The lower center chains 88,89 are driven through level gear means 135,136 from the backshaft 38 and the upper and lower side chains 80,86 and 85,91 are driven by bevel gear means 137,138 stub shafts 142,143 with the lower side sprockets 86b,91b and universally connected shafts 144,145 to the drive sprockets 80b,85b.

The forward shaft 39 drives the upper center chains 82,83 through bevel gear means 148,149 and universal shafts 150,151 and drives the inner side chains 81,87 and 84,90 through the bevel gear means 152,153 and the universal shafts 154,155. Thus the crop gathering chains are driven in unison from the forage harvester.

Wobble Drive for the Sickle

In FIGS. 10—12 enlarged views of the sickle drive 44 mounted by the bracket 160 to the supporting framework 69 on the left side of the base frame is shown and comprises a base plate 161 and mounting plate 162 normal thereto. The yoke 163 and arm 164 are pivotally secured to the mounting plate 162 and are oscillated by the shaft 165 rotatably mounted in the base plate. The arm 164 is connected to and reciprocates the sickle 16. The pulley 166 rotating the shaft 165 is mounted on the shaft between the yoke 163 and the base plate 161 and driven by pulley 159 on the forage harvester. The pulley is positioned underneath the chainboard 74a for the lower left side chain 91. A shield 167 is attached to the left lower frame member 29 and the supporting framework 69.

Features of the Invention

It is thus seen from the foregoing description that a new and improved three row row crop attachment has been developed which may be mounted on a self-propelled or a tractor drawn forage harvester. Three crop conveying passages or stalkways each have two crop gathering chains making a total of 12 crop gathering chains for the attachment. The 12 chains provided form a gripping and conveyance of the stalks to the feed rolls without compromising on lug size or spacing of the chains from the feed roll. The lower chains 88,89 have the lugs sweep adjacent to the feed rolls as well as the lower side chains. This advantage is attained by the chains in the lower set being in three planes or levels. This permits the positioning of the chains as desired with the lugs of adjacent chains not interfering. The side gathering chain lugs sweep up to the end of the center trough.

The bottom of the center trough and the bottom center chains are below the bottom of the side troughs and side chains. This provides a separate layer feeding of the stalks from the center trough under the stalks from the side troughs.

The lower side chains being on a higher level than the lower center chains and the inner side chains in addition to extending the side roughs over the ends of the center chains, the lower side chains extend further forward to assist in picking up fallen crops. Thus the three levels of the lower sets of chains permits each of the stalkways to function equally well in picking up the crops and feeding stalks to the feed rolls.

Another feature of the attachment is the operation of the chains may be reversed. Occasionally the feed to the forage harvester becomes clogged and it is desirable to reverse feed to the stalks and prevent withdrawal of the stalks from the space 23 and the troughs, The chains can be operated in reverse pulling the stalks back without difficulty.

It is further seen that the wobble drive is snugly positioned under the lower left crop gathering chain even though the lower crop gathering chains are at three different levels. This recessing of the wobble drive provides clearance for a power takeoff shaft to a tractor drawing the forage harvester.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A three row row crop attachment for harvesting stalklike crops comprising frame means having a single rear discharge opening and having a center crop gathering passage and two side crop gathering passages on opposite sides of said center passage with respective forward portions widening forwardly passages intermediately turned to terminate at said for respectively receiving three rows of stalklike crops and narrow stalkways rearward of said forward portion, upper and lower chain gathering means for pulling stalklike crops through said passages, said lower chain gathering means having two crop gathering chains on opposite sides of said center crop gathering passage and in the same plane and two sets of crop gathering chains with each set having crop gathering chains on opposite sides of said respective side crop gathering passages, said crop gathering chains on opposite sides of said respective side crop gathering passages being in different planes and planes different from said center crop gathering chains.

2. A three row row crop attachment as set forth in claim 1 wherein said upper chain gathering means comprises crop gathering chains on each side of said respective passages with said crop gathering chains of said side crop gathering passages being in the same plane and said crop gathering chains of said center crop gathering passage being in a other than said same plane.

3. A three row row crop header as set forth in claim 1 wherein said frame means has a sickle and said side passages have upper portions turning towards the rear discharge opening in advance of said sickle and lower portions turning towards said rear discharge opening at said sickle.

4. A three row row crop attachment for harvesting corn comprising a supporting frame having four longitudinally extending laterally spaced lower frame members and a center rear discharge opening, crop guide means mounted on said lower frame members and extending upwardly to form with said lower frame members a center and two side crop gathering passages, crop cutting means mounted on said supporting frame, said lower members and crop guide means narrow said passages to said crop cutting means, said crop guide means extending rearwardly from said crop cutting means with said guide means for said center crop gathering passage having facing parallel sidewalls, said guide means for said side crop gathering passages having walls at an angle extending to said center rear discharge opening, crop gathering means on said guide means having upper and lower sets of crop gathering chain means, said upper crop gathering chain means having three pair of upper crop gathering chains for said center and side crop gathering passages respectively and said lower crop gathering means having three pair of lower crop gathering chains for said center.

5. A three row row crop attachment as set forth in claim 4 wherein said lower frame members are arranged into two outer side lower frame members and two inner lower frame members between said side lower frame members said inner members each having two crop guide means transversely spaced on a respective inner member and said inner lower members have openings for passing debris between said guide means and through said lower frame members.

6. A three row row crop attachment as set forth in Claim 4 wherein said supporting frame has a base frame with said four lower frame members extending forwardly therefrom as two, outer lower frame members on opposite sides and two inner lower frame members on opposite sides of the longitudinal axis of said base frame said base frame having a center platelike means and two side platelike means on opposite sides of said center platelike means said center platelike means having a center crop passing channel and chainboards on opposite sides of said center crop passing channel, said side platelike means having side crop passing channels respectively at an angle to said center crop passing channel and extending towards said rear discharge opening, inner and outer chainboards on opposite sides of said side crop passing channels, said side chainboards on opposite sides of said side channels respectively being in different planes and said center chainboards being in the same plane which is different from the planes of said side chainboards.

7. A three row row crop attachment as set forth in claim 6 wherein said outer side chainboards are in the same plane and said inner side chainboards are in the same plane which is different from said outer side chainboards and said center chainboards.

8. A three row row crop attachment as set forth in claim 7 wherein said side platelike means extend to said respective outer and inner lower frame members and said inner side chainboards extend to said respective inner lower frame members.

9. A three row row crop attachment as set forth in claim 6 wherein a lateral beam extends transversely across the attachment at the forward part of said base frame and a cross beam extends transversely across the rear of said base frame.

10. A three row row crop attachment as set forth in claim 6 wherein said side channels are at a higher level than said center channel for feeding stalks from said side channels to said rear discharge opening at a different level from the stalks from said center channel.

11. A three row row crop attachment as set forth in claim 10 wherein said side channels are at the same level.

12. A three row row crop attachment as set forth in claim 4 wherein forward and rearward drive means are provided with the forward drive means having means connected to said upper center crop gathering chains and means connected to said upper and lower crop gathering chains on the side of said crop gathering passages adjacent to said center crop gathering passage and said rearward drive means having means connected to said lower center crop gathering chains and means connected to said upper and lower side crop gathering chains on the opposite side of said side crop gathering passages adjacent to said center crop gathering passage.

13. A three row row crop attachment as set forth in claim 4 wherein said lower frame members have openings for passing debris to the ground.